(12) United States Patent
Ishii

(10) Patent No.: US 12,687,992 B2
(45) Date of Patent: Jul. 21, 2026

(54) INFORMATION PROCESSING APPARATUS, NON-TRANSITORY COMPUTER READABLE MEDIUM, AND INFORMATION PROCESSING METHOD

(71) Applicant: FUJIFILM BUSINESS INNOVATION CORP., Tokyo (JP)

(72) Inventor: Akihiro Ishii, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/180,174

(22) Filed: Mar. 8, 2023

(65) Prior Publication Data

US 2024/0086123 A1    Mar. 14, 2024

(30) Foreign Application Priority Data

Sep. 13, 2022    (JP) ................................. 2022-145630

(51) Int. Cl.
*G06F 3/12* (2006.01)

(52) U.S. Cl.
CPC ............ *G06F 3/1234* (2013.01); *G06F 3/121* (2013.01); *G06F 3/1236* (2013.01)

(58) Field of Classification Search
CPC ....... G06F 3/121; G06F 3/1234; G06F 3/1236
See application file for complete search history.

(56) References Cited

U.S. PATENT DOCUMENTS

| | | | |
|---|---|---|---|
| 2010/0050017 A1* | 2/2010 | Almadi | E21B 47/12 |
| | | | 713/400 |
| 2015/0212904 A1* | 7/2015 | Scanlon | G06F 11/3476 |
| | | | 714/19 |
| 2020/0361216 A1* | 11/2020 | Tanaka | B41J 2/17509 |
| 2021/0294549 A1* | 9/2021 | Nakahara | G06F 17/40 |
| 2021/0377417 A1* | 12/2021 | Nishikawa | H04N 1/32122 |

FOREIGN PATENT DOCUMENTS

| | | |
|---|---|---|
| JP | 2020-154819 A | 9/2020 |
| JP | 2021-197560 A | 12/2021 |

* cited by examiner

*Primary Examiner* — John R Wallace
(74) *Attorney, Agent, or Firm* — Oliff PLC

(57) ABSTRACT

An information processing apparatus includes a processor configured to: if communication with a management apparatus managing the information processing apparatus failed, record a failure time and a restoration time in a storage unit of the information processing apparatus, the failure time being a time of the failure of the communication with the management apparatus, the restoration time being a time of restoration of the communication; receive a presentation instruction to present information about utilization of the information processing apparatus; if communication with the management apparatus failed before reception of the presentation instruction, transmit the failure time and the restoration time to an external storage device; and present the information about utilization of the information processing apparatus between the failure time and the restoration time, the presented information about utilization being received from the storage device.

9 Claims, 6 Drawing Sheets

FIG. 4

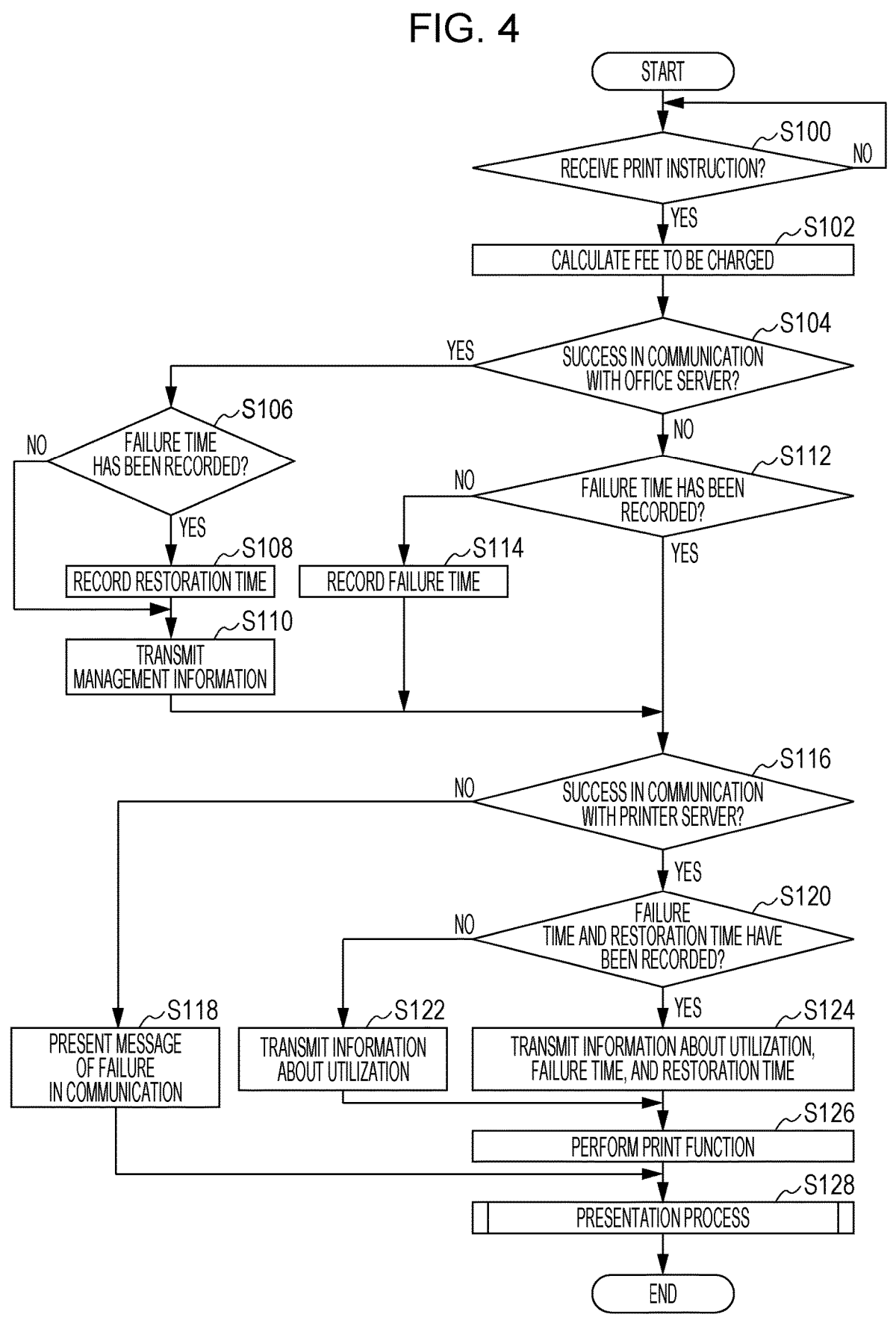

START

S100 — RECEIVE PRINT INSTRUCTION? — NO

YES

S102 — CALCULATE FEE TO BE CHARGED

S104 — SUCCESS IN COMMUNICATION WITH OFFICE SERVER?

YES

S106 — FAILURE TIME HAS BEEN RECORDED? — NO

YES

S108 — RECORD RESTORATION TIME

S110 — TRANSMIT MANAGEMENT INFORMATION

NO

S112 — FAILURE TIME HAS BEEN RECORDED?

NO

S114 — RECORD FAILURE TIME

YES

S116 — SUCCESS IN COMMUNICATION WITH PRINTER SERVER? — NO

YES

S120 — FAILURE TIME AND RESTORATION TIME HAVE BEEN RECORDED?

NO

S118 — PRESENT MESSAGE OF FAILURE IN COMMUNICATION

S122 — TRANSMIT INFORMATION ABOUT UTILIZATION

YES

S124 — TRANSMIT INFORMATION ABOUT UTILIZATION, FAILURE TIME, AND RESTORATION TIME

S126 — PERFORM PRINT FUNCTION

S128 — PRESENTATION PROCESS

END

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-145630 filed Sep. 13, 2022.

BACKGROUND

(i) Technical Field

The present disclosure relates to an information processing apparatus, a non-transitory computer readable medium, and an information processing method.

(ii) Related Art

Japanese Unexamined Patent Application Publication No. 2021-197560 discloses an image forming apparatus. The image forming apparatus includes a controller. If an error occurs in transmission of an audit log of the image forming apparatus to an external apparatus and if the error occurs in writing of the audit log in the external apparatus, the controller exerts control so that the file name of the audit log is changed and the audit log is transmitted to the external apparatus.

Japanese Unexamined Patent Application Publication No. 2020-154819 discloses an information processing apparatus. The information processing apparatus includes a receiving unit and a generating unit. The receiving unit obtains identification information for identifying a user and receives a request to do a job on a device that is to be used. The generating unit does the job by using a function included in the device, and generates history information including the identification information and the execution result of the job. The information processing apparatus also includes a presentation unit that conceals all or part of the history information in accordance with a viewer's permission, and presents the concealed history information.

An information processing apparatus stores, in its storage unit, information about utilization of the information processing apparatus in a period during which the information processing apparatus fails to communicate with a management apparatus which manages the information processing apparatus. However, the information about utilization may fail to be stored depending on the capacity of the storage unit. Thus, an operator sometimes may fail to grasp the utilization.

SUMMARY

Aspects of non-limiting embodiments of the present disclosure relate to an information processing apparatus, a non-transitory computer readable medium, and an information processing method which enable utilization of the information processing apparatus in a period, during which the information processing apparatus fails to communicate with a management apparatus, to be grasped regardless of the capacity of the storage unit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to: if communication with a management apparatus managing the information processing apparatus failed, record a failure time and a restoration time in a storage unit of the information processing apparatus, the failure time being a time of the failure of the communication with the management apparatus, the restoration time being a time of restoration of the communication; receive a presentation instruction to present information about utilization of the information processing apparatus; if communication with the management apparatus failed before reception of the presentation instruction, transmit the failure time and the restoration time to an external storage device; and present the information about utilization of the information processing apparatus between the failure time and the restoration time, the presented information about utilization being received from the storage device.

BRIEF DESCRIPTION OF THE DRAWINGS

Exemplary embodiment of the present disclosure will be described in detail based on the following figures, wherein:

FIG. 4 is a flowchart of exemplary information processing performed by an image forming apparatus according to an exemplary embodiment;

DETAILED DESCRIPTION

Figure 1:
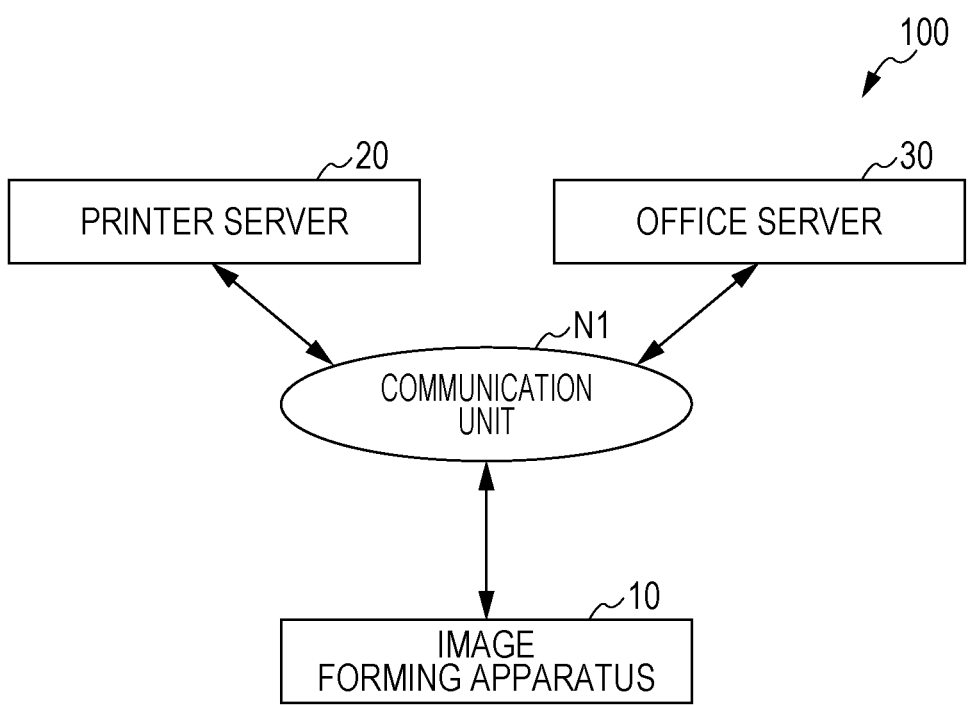
FIG. 1 is a schematic diagram illustrating an exemplary hardware configuration of an information processing system according to an exemplary embodiment.

An exemplary embodiment of the present disclosure will be described below by referring to the drawings. In the drawings, the same or equivalent components and parts are designated with the same reference numerals. The dimensional ratios in the drawings are exaggerated for convenience of description, and may be different from the actual ratios.

As illustrated in FIG. 1, an information processing system 100 according to the present exemplary embodiment includes an image forming apparatus 10, a printer server 20, and an office server 30.

The image forming apparatus 10, the printer server 20, and the office server 30 are capable of communicating with each other through a communication unit N1. In the present exemplary embodiment, the communication unit N1 is an in-house communication line, such as a local area network (LAN) or a wide area network (WAN). However, the configuration is not limited to this example. For example, the communication unit N1 may be a public communication line, such as the Internet or a telephone line, or a combination of an in-house communication line and a public communication line. In the present exemplary embodiment, the communication unit N1 is a wireless communication line. Alternatively, the communication unit N1 may be a wired communication line or a combination of wired and wireless communication lines.

In the present exemplary embodiment, the image forming apparatus 10, which is disposed, for example, in a shared office, in which multiple companies share an office space, or a private office, is used as an information processing apparatus. However, the configuration is not limited to this example. The information processing apparatus may be any apparatus which performs information processing. The information processing includes, for example, performing printing using character data, image data, or the like, generating or processing data by using facilities included in an information processing apparatus, and receiving/transmitting data between an information processing apparatus and another device.

In the present exemplary embodiment, the printer server 20 is used as an external storage device of the image forming apparatus 10. The printer server 20 according to the present exemplary embodiment stores information about errors, which occurred in the image forming apparatus 10, and consumables, utilization of the image forming apparatus 10, and the like. However, the configuration is not limited to this example. The external storage device may be any storage device such as a storage.

In the present exemplary embodiment, the office server 30 is used as a management apparatus which manages the image forming apparatus 10. The office server 30 according to the present exemplary embodiment charges an office usage fee, which is obtained through calculation based on the time for which a user stays in the shared office or the private office, plus a usage fee for the image forming apparatus 10. However, the configuration is not limited to this example. The management apparatus may be any apparatus such as a personal computer capable of managing the image forming apparatus 10.

Figure 2:
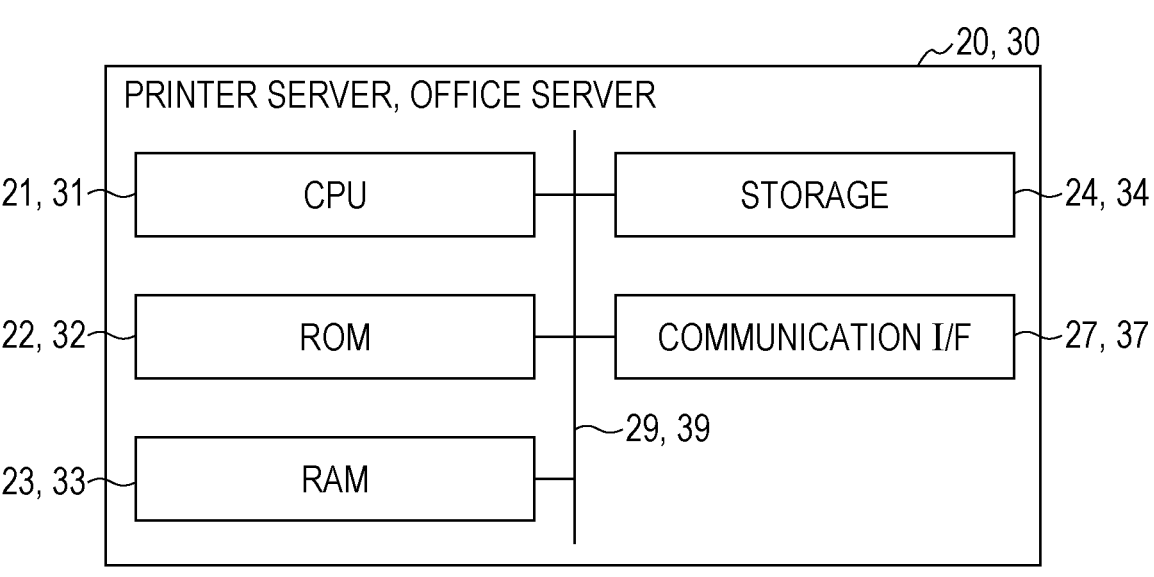
FIG. 2 is a block diagram illustrating an exemplary hardware configuration of a printer server and an office server according to an exemplary embodiment.

As illustrated in FIG. 2, the printer server 20 includes configurations of a central processing unit (CPU) 21, a read only memory (ROM) 22, a random access memory (RAM) 23, a storage 24, and a communication interface (UF) 27. The configurations are communicatively connected to each other through a bus 29. The printer server 20 and the office server 30 are assumed to have a typical computer configuration. Thus, the printer server 20 will be described as a typical apparatus, and the office server 30 will not be described. Only its corresponding reference numerals are illustrated in FIG. 2.

The CPU 21, which is a central processing unit, runs various programs, and controls the units. That is, the CPU 21 reads programs from the ROM 22 or the storage 24, and runs programs by using the RAM 23 as a work area. According to programs stored in the ROM 22 or the storage 24, the CPU 21 controls the configurations and performs various computations.

The ROM 22 stores various programs and various types of data. The RAM 23 serves as a work area which temporality stores programs or data. The storage 24, which is formed of a storage device, such as a hard disk drive (HDD) or a solid state drive (SSD), stores various programs, including an operating system, and various types of data.

The communication OF 27, which is an interface for communicating with other devices such as the image forming apparatus 10, employs standards, such as Ethernet™, fiber distributed data interface (FDDI), and wireless fidelity (Wi-Fi™).

Figure 3:
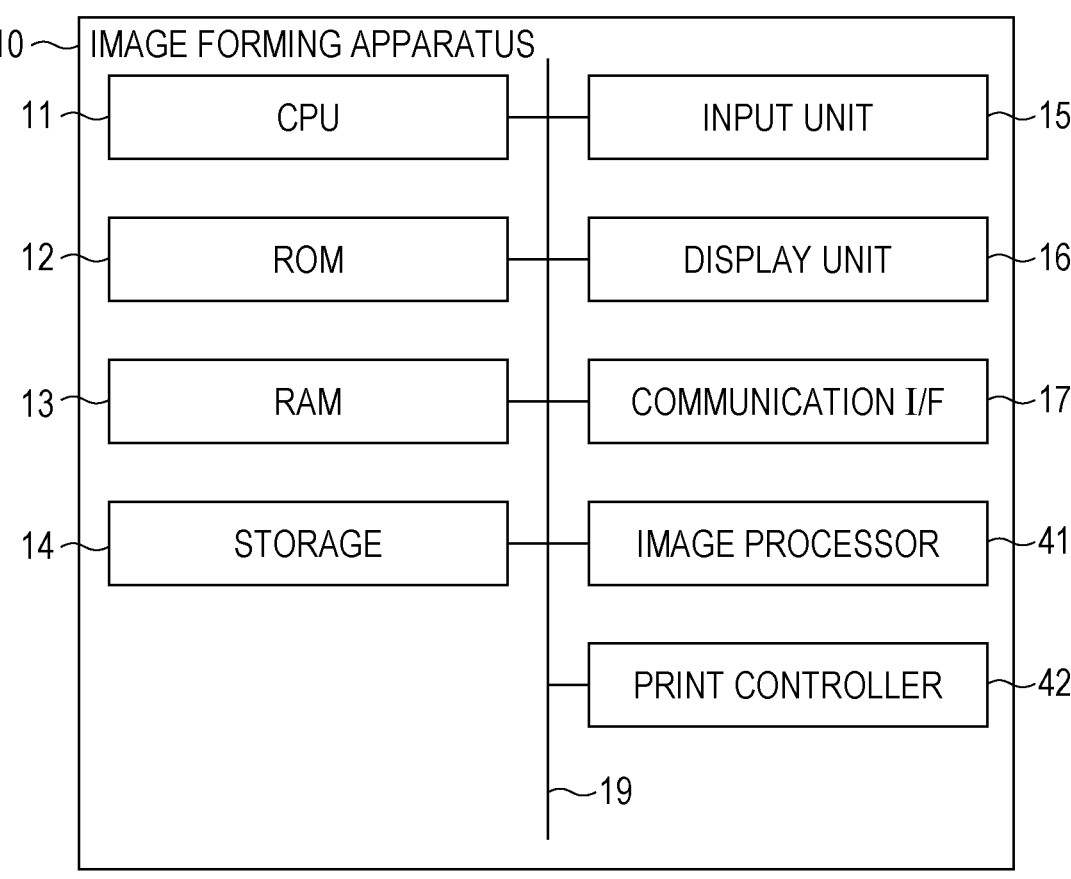
FIG. 3 is a block diagram illustrating an exemplary hardware configuration of an image forming apparatus according to an exemplary embodiment.

As illustrated in FIG. 3, the image forming apparatus 10 includes configurations of a CPU 11, a ROM 12, a RAM 13, a storage 14, an input unit 15, a display unit 16, a communication OF 17, an image processor 41, and a print controller 42. The configurations are communicatively connected to each other through a bus 19.

The CPU 11, which is a central processing unit, runs various programs, and controls the units. That is, the CPU 11 reads programs from the ROM 12 or the storage 14 serving as a storage unit, and runs programs by using the RAM 13 as a work area. According to programs stored in the ROM 12 or the storage 14, the CPU 11 controls the configurations and performs various computations. In the present exemplary embodiment, the ROM 12 or the storage 14 stores an information processing program.

In the present exemplary embodiment, the storage 14 records a failure time, at which the image forming apparatus 10 failed to communicate with the office server 30, and a restoration time, at which communication between the image forming apparatus 10 and the office server 30 was restored.

The ROM 12 stores various programs and various types of data. The RAM 13 serves as a work area which temporality stores programs or data. The storage 14, which is formed of a storage device, such as an HDD or an SSD, stores various programs, including an operating system, and various types of data.

The input unit 15, which includes a pointing device such as a mouse and a keyboard, is used to perform various types of input.

The display unit 16, which is, for example, a liquid-crystal display, displays various types of information. The display unit 16, which employs a touch panel system, may function as the input unit 15.

The communication OF 17, which is an interface for communicating with other devices, such as the printer server 20 and the office server 30, employs standards, such as Ethernet™, FDDI, and Wi-Fi™.

The image processor 41 performs various types of image processing. For example, the print controller 42 performs image formation, detection of a sheet fed on a tray, and transport of a sheet.

Figure 5:
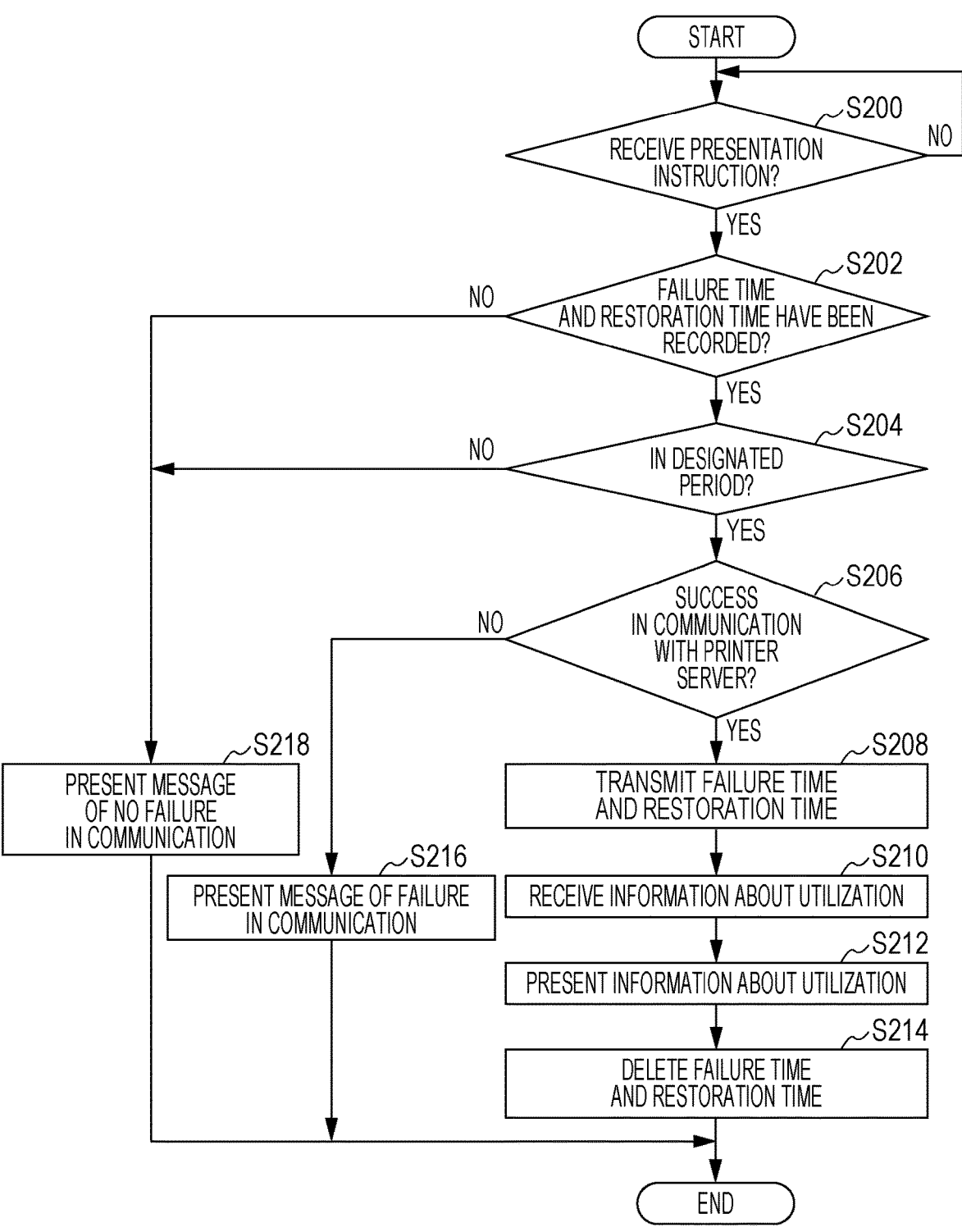
FIG. 5 is a flowchart of an exemplary presentation process performed by an image forming apparatus according to an exemplary embodiment.

Referring to FIGS. 4 and 5, the flow of information processing performed by the image forming apparatus 10 according to the present exemplary embodiment will be described. The information processing is performed by the CPU 11 reading the information processing program from the ROM 12 or the storage 14 and loading the information processing program on the RAM 13 for execution.

In step S100 in FIG. 4, the CPU 11 waits until the CPU 11 receives a print instruction to perform a print function included in the image forming apparatus 10. For example, the CPU 11 waits until the CPU 11 receives a print instruction through the input unit 15. If the CPU 11 receives a print instruction (YES in step S100), the CPU 11 proceeds to step S102.

In step S102, the CPU 11 calculates a fee charged to a user who has transmitted the print instruction (hereinafter simply referred to as a "user"). Specifically, the CPU 11 calculates a fee, which is to be charged to the user, on the basis of the content of the print instruction (for example, the number of print copies, the color, and the size of sheets).

In step S104, the CPU 11 checks the state of communication with the office server 30, and determines whether communication with the office server 30 has been success-fully performed. If the communication with the office server 30 has been successfully performed (YES in step S104), the CPU 11 proceeds to step S106.

In step S106, the CPU 11 determines whether a failure time is recorded in the storage 14. If a failure time is recorded in the storage 14 (YES in step S106), the CPU 11 proceeds to step S108. In contrast, if a failure time is not recorded in the storage 14 (NO in step S106), the CPU 11 proceeds to step S110.

In step S108, the CPU 11 records, in the storage 14, a restoration time, that is, a time at which step S104 was performed to check the state of communication with the office server 30.

In step S110, the CPU 11 transmits, to the office server 30, management information including the user and the fee to be charged, and the CPU 11 proceeds to step S116. The office server 30, which has received the management information, stores the management information in the storage 34.

Back to step S104, if communication with the office server 30 has failed to be performed (NO in step S104), the CPU 11 proceeds to step S112. In step S112, the CPU 11 determines whether a failure time is recorded in the storage 14. If a failure time is recorded in the storage 14 (YES in step S112), the CPU 11 proceeds to step S116. In contrast, if a failure time is not recorded in the storage 14 (NO in step S112), the CPU 11 proceeds to step S114.

In step S114, the CPU 11 records, in the storage 14, a failure time, that is, a time at which step S104 was per-formed to check the state of communication with the office server 30.

In step S116, the CPU 11 checks the state of communi-cation with the printer server 20, and determines whether communication with the printer server 20 has been success-fully performed. If communication with the printer server 20 has been successfully performed (YES in step S116), the CPU 11 proceeds to step S120. In contrast, if communica-tion with the printer server 20 has failed to be performed (NO in step S116), the CPU 11 proceeds to step S118.

In step S118, the CPU 11 presents, to the user, a message that communication with the printer server 20 has failed to be performed, and the CPU 11 proceeds to step S128. In the present exemplary embodiment, the CPU 11 displays, on the display unit 16, the message that communication with the printer server 20 has failed to be performed. However, the configuration is not limited to this example. For example, the CPU 11 may present the message that communication with the printer server 20 has failed to be performed, for example, through a speaker included in the image forming apparatus or a terminal carried by the user.

In step S120, the CPU 11 determines whether a failure time and a restoration time are recorded in the storage 14 of the image forming apparatus 10. If a failure time and a restoration time are recorded in the storage 14 (YES in step S120), the CPU 11 proceeds to step S124. In contrast, if a failure time and a restoration time are not recorded in the storage 14 (NO in step S120), the CPU 11 proceeds to step S122.

In step S122, the CPU 11 transmits, to the printer server 20, as information about utilization of the image forming apparatus 10, information including the content of the print instruction, the user, and the date and time at which the print instruction was received. That is, the CPU 11 transmits, to the printer server 20, information including a print job which is information used in execution of the print function. Then, the CPU 11 proceeds to step S126.

In step S124, the CPU 11 transmits, to the printer server 20, the failure time and the restoration time in addition to the information about utilization. That is, the CPU 11 transmits, to the printer server 20, the failure time and the restoration time in addition to information including the print job. Then, the CPU 11 proceeds to step S126.

In step S126, the CPU 11 performs the print function on the basis of the content of the print instruction.

In step S128, the CPU 11 performs a presentation process, and ends the information processing. The presentation pro-cess will be described in detail below.

Referring to FIG. 5, the presentation process performed by the image forming apparatus 10 according to the present exemplary embodiment will be described.

In step S200 in FIG. 5, the CPU 11 waits until the CPU 11 receives, through the input unit 15, a presentation instruc-tion to present information about utilization of the image forming apparatus 10 in a predetermined period (hereinafter referred to as a "designated period"). If the CPU 11 receives a presentation instruction to present information about uti-lization of the image forming apparatus 10 in a designated period (YES in step S200), the CPU 11 proceeds to step S202.

In the description below, an operator who transmits an instruction to present information about utilization of the image forming apparatus 10 is simply referred to as an "operator". The operator is, for example, a manager of the office server 30. For example, while communication between the image forming apparatus 10 and the office server 30 fails to be performed, management information is not stored in the office server 30. Therefore, a manager of the office server 30 transmits, to the image forming apparatus 10, a presentation instruction to present information about utilization of the image forming apparatus 10 in a designated period. However, the configuration is not limited to this example. The operator may be, for example, a user of the image forming apparatus 10.

In step S202, the CPU 11 determines whether a failure time and a restoration time are recorded in the storage 14 of the image forming apparatus 10. If a failure time and a restoration time are recorded in the storage 14 (YES in step S202), the CPU 11 proceeds to step S204.

In step S204, the CPU 11 determines whether the failure time and the restoration time which are recorded in the storage 14 are within the designated period. If the failure time and the restoration time are in the designated period, (YES in step S204), the CPU 11 proceeds to step S206.

In step S206, the CPU 11 checks the state of communi-cation with the printer server 20, and determines whether communication with the printer server 20 has been success-fully performed. If communication with the printer server 20 has been successfully performed (YES in step S206), the CPU 11 proceeds to step S208.

In step S208, the CPU 11 transmits, to the printer server 20, the failure time and the restoration time which are recorded in the storage 14.

In step S210, the CPU 11 receives, from the printer server 20, information about utilization of the image forming apparatus 10 between the failure time and the restoration time.

In step S212, the CPU 11 presents the received informa-tion about utilization of the image forming apparatus 10 between the failure time and the restoration time. In the present exemplary embodiment, the CPU 11 displays, on the display unit 16, the information about utilization of the image forming apparatus 10 between the failure time and the restoration time. However, the configuration is not limited to this example. For example, the CPU 11 may present the information about utilization of the image forming apparatus 10 between the failure time and the restoration time, for example, through a speaker included in the image forming apparatus or a terminal carried by the user.

In step S214, the CPU 11 deletes the failure time and the restoration time recorded in the storage 14, and ends the presentation process.

Back to step S206, if communication with the printer server 20 has failed to be performed (NO in step S206), the CPU 11 proceeds to step S216. In step S216, the CPU 11 presents a message that communication with the printer server 20 has failed to be performed, and ends the presentation process.

Back to step S202, if a failure time and a restoration time are not recorded in the storage 14 (NO in step S202), the CPU 11 proceeds to step S218. In step S204, if the failure time and the restoration time are not within the designated period (NO in step S204), the CPU 11 proceeds to step S218. In step S218, the CPU 11 presents a message that no failure has occurred in communication with the office server 30, and ends the presentation process. In the present exemplary embodiment, the CPU 11 displays, on the display unit 16, a message that no failure has occurred in communication with the office server 30. However, the configuration is not limited to this example. For example, the CPU 11 may present a message that no failure has occurred in communication with the office server 30, for example, through a speaker included in the image forming apparatus or a terminal carried by the user.

Figure 6:
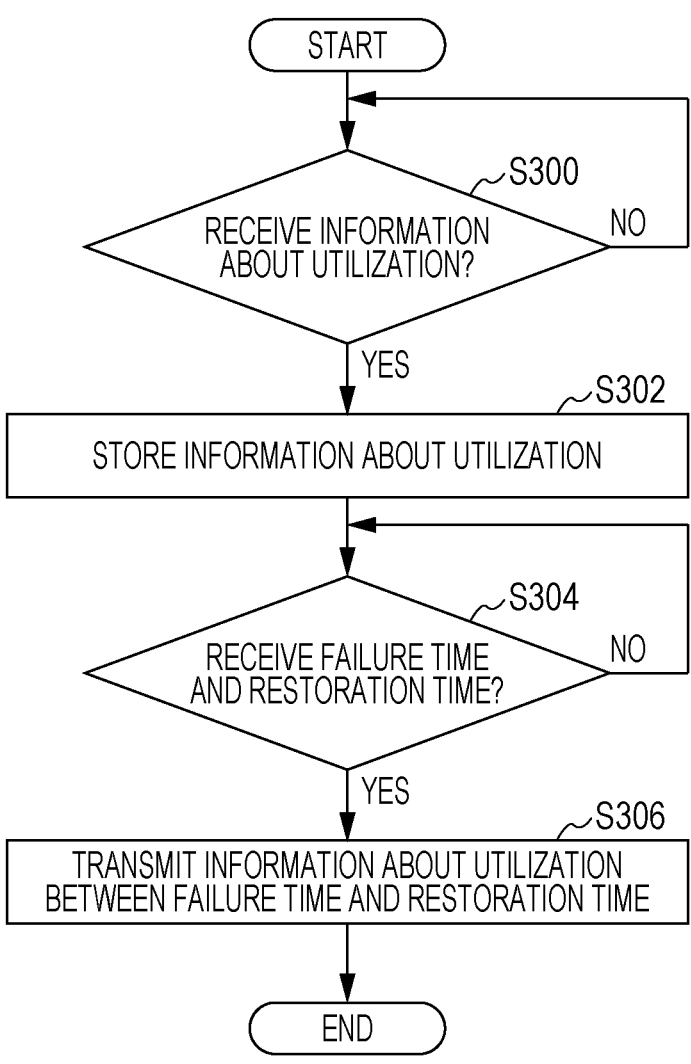
FIG. 6 is a flowchart of an exemplary storage process performed by a printer server according to an exemplary embodiment.

Referring to FIG. 6, the flow of a storage process performed by the printer server 20 according to the present exemplary embodiment will be described. The storage process is performed by the CPU 21 reading a storage-process program from the ROM 22 or the storage 24 and loading the storage-process program on the RAM 23 for execution.

In step S300 in FIG. 6, the CPU 21 waits until the CPU 21 receives, from the image forming apparatus 10, information about utilization. If the CPU 21 receives information about utilization from the image forming apparatus 10 (YES in step S300), the CPU 21 proceeds to step S302.

In step S302, the CPU 21 stores, in the storage 24, the information about utilization which is received from the image forming apparatus 10. If the CPU 21 receives, from the image forming apparatus 10, a failure time and a restoration time in addition to the information about utilization in step S300, the CPU 21 records, in the storage 24, the failure time and the restoration time in association with the information about utilization.

In step S304, the CPU 21 waits until the CPU 21 receives a failure time and a restoration time from the image forming apparatus 10. If the CPU 21 receives a failure time and a restoration time from the image forming apparatus 10 (YES in step S304), the CPU 21 proceeds to step S306.

In step S306, the CPU 21 reads, from the storage 24, information about utilization of the image forming apparatus 10 between the failure time and the restoration time which are received from the image forming apparatus 10, and transmits the information about utilization to the image forming apparatus 10. Then, the CPU 21 ends the storage process.

The exemplary embodiment is described above. The technical scope of the present disclosure is not limited to the scope of the exemplary embodiment. Various changes and improvements may be made to the exemplary embodiment without departing from the gist of the present disclosure. An embodiment, to which the changes and the improvements are added, is also encompassed in the technical scope of the present disclosure.

The exemplary embodiment does not limit the claimed disclosure. Not all the combinations of features described in the exemplary embodiment are needed for the solution of the present disclosure. The exemplary embodiment described above includes various stages of disclosure. Various disclosures are extracted from combinations of disclosed components. If one or more components are deleted from all the components described in the exemplary embodiment, the configuration, in which the one or more components are deleted, may be extracted as a disclosure as long as the effect is exerted.

For example, in the present exemplary embodiment, the CPU 11 receives a presentation instruction to present information about utilization of the image forming apparatus 10 in a designated period. However, the configuration is not limited to this example. The CPU 11 may receive a presentation instruction to present information about utilization without a limited period. In this case, if communication with the office server 30 failed to be performed before reception of the presentation instruction, the CPU 11 transmits, to the printer server 20, the failure time and the restoration time which are recorded in the storage 14.

In the present exemplary embodiment, a function included in the image forming apparatus 10 is the print function. However, the configuration is not limited to this example. For example, a function included in the image forming apparatus 10 may be an image reading function, an image transmission function, or the like, or may be a combination of these functions.

In the present exemplary embodiment, the CPU 11 regards the case in which a failure time and a restoration time are not recorded in the storage 14, as the case in which no failure has occurred in communication with the office server 30. In this case, in response to a presentation instruction to present information about utilization, the CPU 11 presents a message that no failure has occurred in communication with the office server 30. However, the configuration is not limited to this example. Regardless of whether a failure time and a restoration time are recorded in the storage 14, if a result, indicating that communication with the office server 30 has been successfully performed, is recorded in the storage 14, the CPU 11 may present a message that no failure has occurred in communication with the office server 30.

In the present exemplary embodiment, even when a failure time and a restoration time are not recorded in the storage 14, the CPU 11 may present information about utilization of the image forming apparatus 10 in a designated period.

In the embodiments above, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the exemplary embodiments, the form in which the information processing program is installed in the ROM 12 or the storage 14 is described. However, the configuration is not limited to this. The information processing program according to the exemplary embodiments may be provided by storing the information processing program in a computer-readable storage medium. For example, the information processing program according to the exemplary embodiments may be provided by recording the information processing program in an optical disk, such as a compact disc (CD)-ROM or a digital versatile disc (DVD)-ROM, or in a semiconductor memory, such as a Universal Serial Bus (USB) memory or a memory card. Alternatively, the information processing program according to the exemplary embodiments may be obtained from an external apparatus through the communication OF 17.

In the exemplary embodiments, the case in which the processes performed by the image forming apparatus 10 and the printer server 20 are performed by using a computer with a software configuration through execution of programs is described. The present disclosure is not limited to this. For example, the process performed by the image forming apparatus 10 may be performed by using a hardware configuration or a combination of a hardware configuration and a software configuration.

The configurations of the image forming apparatus 10, the printer server 20, and the office server 30 which are described in the exemplary embodiments are exemplary. Needles to say, unnecessary components may be deleted, and new components may be added without departing from the gist of the present disclosure.

The flows, described in the exemplary embodiments, of the processes performed by the image forming apparatus 10 (see FIGS. 4 and 5) and the process performed by the printer server 20 (see FIG. 6) are also exemplary. Needless to say, unnecessary steps may be deleted, new steps may be added, and the processing order may be switched without departing from the gist of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
    An information processing apparatus comprising:
    a processor configured to:
        if communication with a management apparatus managing the information processing apparatus failed, record a failure time and a restoration time in a storage unit of the information processing apparatus, the failure time being a time of the failure of the communication with the management apparatus, the restoration time being a time of restoration of the communication;
        receive a presentation instruction to present information about utilization of the information processing apparatus;
        if communication with the management apparatus failed before reception of the presentation instruction, transmit the failure time and the restoration time to an external storage device; and
        present the information about utilization of the information processing apparatus between the failure time and the restoration time, the presented information about utilization being received from the storage device.

(((2)))
    The information processing apparatus according to (((1))),
    wherein the processor is configured to:
        receive an execution instruction to perform a function included in the information processing apparatus; and,
        even if communication with the management apparatus fails, perform the function.

(((3)))
    The information processing apparatus according to (((2))),
    wherein information used in execution of the function is stored in the storage device, and
    wherein the processor is configured to:
        even if communication with the management apparatus fails, when communication with the storage device is successfully performed, perform the function.

(((4)))
    The information processing apparatus according to (((3))),
    wherein the function includes printing, and
    wherein the information used in execution of the function includes a print job.

(((5)))
    The information processing apparatus according to (((3))) or (((4))),
    wherein the processor is configured to:
        in execution of the function, cause the storage device to store, as the information about utilization, information including content of the execution instruction, a user who transmits the execution instruction, and a date and time of reception of the execution instruction.

(((6)))
    The information processing apparatus according to any one of (((1))) to (((5))),
    wherein the processor is configured to:
        if no failure has occurred in communication with the management apparatus before reception of the presentation instruction, present a message that no failure has occurred in communication with the management apparatus.

(((7)))
    The information processing apparatus according to (((6))),
    wherein the processor is configured to:
        regard a case in which the failure time and the restoration time are not recorded in the storage unit, as a case in which no failure has occurred in communication with the management apparatus, and, in response to the presentation instruction, present a message that no failure has occurred in communication with the management apparatus.

(((8)))
    An information processing program causing a computer to execute a process comprising:
        if communication with a management apparatus managing an information processing apparatus failed, recording a failure time and a restoration time in a storage unit of the information processing apparatus, the failure time being a time of the failure of the communication with the management apparatus, the restoration time being a time of restoration of the communication;

receiving a presentation instruction to present information about utilization of the information processing apparatus;

if communication with the management apparatus failed before reception of the presentation instruction, transmitting the failure time and the restoration time to an external storage device; and presenting the information about utilization of the information processing apparatus between the failure time and the restoration time, the presented information about utilization being received from the storage device.

What is claimed is:

1. An information processing apparatus comprising:
a processor configured to:
    if communication with a management apparatus managing the information processing apparatus failed, record a failure time and a restoration time in a storage unit of the information processing apparatus, the failure time being a time of the failure of the communication with the management apparatus, the restoration time being a time of restoration of the communication;
    receive a presentation instruction to present information about utilization of the information processing apparatus;
    if communication with the management apparatus failed before reception of the presentation instruction, transmit the failure time and the restoration time to an external storage device different from the management apparatus; and
    present, via a display or audio output interface of the information processing apparatus, the information about utilization of the information processing apparatus between the failure time and the restoration time, the presented information about utilization being separate and distinct from the failure time and the restoration time and being received from the external storage device.

2. The information processing apparatus according to claim 1,
wherein the processor is configured to:
    receive an execution instruction to perform a function included in the information processing apparatus; and,
    even if communication with the management apparatus fails, perform the function.

3. The information processing apparatus according to claim 2,
wherein information used in execution of the function is stored in the external storage device, and
wherein the processor is configured to:
    even if communication with the management apparatus fails, when communication with the external storage device is successfully performed, perform the function.

4. The information processing apparatus according to claim 3,
wherein the function includes printing, and
wherein the information used in execution of the function includes a print job.

5. The information processing apparatus according to claim 3, wherein the processor is configured to:
    in execution of the function, cause the external storage device to store, as the information about utilization, information including content of the execution instruction, a user who transmits the execution instruction, and a date and time of reception of the execution instruction.

6. The information processing apparatus according to claim 1,
wherein the processor is configured to:
    if no failure has occurred in communication with the management apparatus before reception of the presentation instruction, present a message that no failure has occurred in communication with the management apparatus.

7. The information processing apparatus according to claim 6,
wherein the processor is configured to:
    regard a case in which the failure time and the restoration time are not recorded in the storage unit, as a case in which no failure has occurred in communication with the management apparatus, and, in response to the presentation instruction, present a message that no failure has occurred in communication with the management apparatus.

8. A non-transitory computer readable medium storing a program causing a computer to execute a process for information processing, the process comprising:
if communication with a management apparatus managing an information processing apparatus failed, recording a failure time and a restoration time in a storage unit of the information processing apparatus, the failure time being a time of the failure of the communication with the management apparatus, the restoration time being a time of restoration of the communication;
receiving a presentation instruction to present information about utilization of the information processing apparatus;
if communication with the management apparatus failed before reception of the presentation instruction, transmitting the failure time and the restoration time to an external storage device different from the management apparatus; and
presenting, via a display or audio output interface of the information processing apparatus, the information about utilization of the information processing apparatus between the failure time and the restoration time, the presented information about utilization being separate and distinct from the failure time and the restoration time and being received from the external storage device.

9. An information processing method comprising:
if communication with a management apparatus managing an information processing apparatus failed, recording a failure time and a restoration time in a storage unit of the information processing apparatus, the failure time being a time of the failure of the communication with the management apparatus, the restoration time being a time of restoration of the communication;
receiving a presentation instruction to present information about utilization of the information processing apparatus;
if communication with the management apparatus failed before reception of the presentation instruction, transmitting the failure time and the restoration time to an external storage device different from the management apparatus; and presenting, via a display or audio output interface of the information processing apparatus, the information about utilization of the information processing apparatus between the failure time and the restoration time, the presented information about utilization being separate and distinct from the failure time and the restoration time and being received from the external storage device.

\* \* \* \* \*